Patented Apr. 8, 1952

2,592,447

UNITED STATES PATENT OFFICE 2,592,447

INITIATION BY AMMONIA OR AMINES OF AMINO ACID N-CARBO-ANHYDRIDE CONDENSATION POLYMERIZATION

Robert Neal MacDonald, New Castle, Del., assignor to E. I. du Pont de Nemours & Company, Wilmington, Del., a corporation of Delaware No Drawing. Application October 4, 1947, Serial No. 778,031

18 Claims. (Cl. 260—77.5)

This invention has as an object the preparation amides and, more particularly, to an improved method for preparing linear polyamides from amino acid N-carboanhydrides.

This invention has an object the preparation, from N-carboanhydrides of amino acids, of polymers of amino acids. A further object is the provision of an improved process for the preparation of high molecular weight amino acid polymers. Other objects will appear hereinafter.

These objects are accomplished by the following invention wherein the condensation polymerization of amino acid N-carboanhydrides is conducted using, as the initiator, from 1.0 to 0.001 mole per cent, based on the total N-carboanhydrides employed, of ammonia or an amino hydrogen containing amine having at most two hydrogen bearing amino groups, i. e., for each mole of amino acid N-carboanhydride, 0.010 to 0.00001 mole of ammonia or amine is used. The initiating action of such small amounts of ammonia or these selected amines is evident in both solution and bulk polymerizations.

The N-carboanhydrides used in this invention may be prepared by the method of Leuchs, Ber. 39, 857–861 (1906) or, as disclosed in greater detail in my copending application, filed October 7, 1947, Serial No. 778,458 now abandoned but replaced by a continuation-in-part thereof, Serial No. 83,299, filed March 24, 1949, by the reaction of phosgene with the amino acid or its alkali metal or alkaline earth metal salts under anhydrous conditions.

The following examples in which parts are by weight are illustrative of the invention.

EXAMPLE I

A mixture of five parts of the N-carboanhydride of 1-aminocyclohexanecarboxylic acid and seven parts of a solution of diethyl ether containing 0.01 part (0.38 mole per cent based on N-carboanhydride) of tetramethylenediamine as initiator was placed in a glass tube and the ether removed under reduced pressure. The contents of the tube were then heated at atmospheric pressure, i. e., with one end of the tube open, under nitrogen at 146° C. A clear melt was obtained and polymerization began at once, as indicated by bubbles of carbon dioxide rising through the liquid melt. Within twenty minutes a white, solid polymer of 1-aminocyclohexane-carboxylic acid was obtained in quantitative yield. The polymer was insoluble in boiling m-cresol, soluble in concentrated sulfuric acid, and did not fuse below 330° C.

Another sample from the same batch of the N-carboanhydride was heated under the same conditions without the added initiator. In this case four hours' heating time was necessary for the melt to become completely solid, and evolution of carbon dioxide during the heating cycle was noticeably slower than in the foregoing example when the small amount of initiator was present.

EXAMPLE II

A mixture of five parts of the N-carboanhydride of alpha-aminoisobutyric acid, 2.5 parts of the N-carboanhydride of 1-aminocyclohexanecarboxylic acid, and seven parts of a solution of diethyl ether containing 0.01 part (0.19 mole per cent based on the total N-carboanhydrides charged) of tetramethylenediamine as initiator was heated at atmospheric pressure under nitrogen at 146° C. A clear melt was obtained which immediately evolved carbon dioxide with vigorous foaming to give, in four minutes' time, a white, solid copolymer of alpha-aminoisobutyric acid and 1-aminocyclohexanecarboxylic acid in quantitative yield. This copolymer was soluble in m-cresol, chloroform, and cyclohexanone.

Analysis. — Calculated for copolymers: N, 14.55%. Found: N, 14.65%.

Under like conditions, three to four hours' heating time was required to produce a similar copolymer from another sample of this same mixture made up from the same batch of N-carboanhydrides without the small amount of added initiator, and the rate of evolution of carbon dioxide was appreciably less than in the foregoing example with the added initiator.

EXAMPLE III

A mixture of three parts each of the N-carboanhydrides of dl-beta-phenylalanine and 1-aminocyclohexanecarboxylic acid, together with seven parts of a solution of diethyl ether containing 0.01 part (0.34 mole per cent based on total N-carboanhydrides charged) of tetramethylenediamine was heated at atmosphere pressure under nitrogen at 146° C. Immediate evolution of carbon dioxide with foaming occurred. The melt solidified in four minutes' time to a white, m-cresol-soluble copolymer of dl-beta-phenylalanine and 1-aminocyclohexanecarboxylic acid in quantitative yield. The polymer softened at 160° C. and melted to a clear, very viscous liquid at 210° C. A thin, transparent, self-supporting film was pressed from the polymer at 240° C. in one minute's time under 5000 lb./sq. in. pressure.

EXAMPLE IV

To a solution of two parts of the N-carboanhydride of 2-amino-4,6,6-trimethylheptanoic acid in 148.9 parts of chloroform was added 1.489 parts of a chloroform solution containing 0.001 part (0.15 mole per cent based on N-carbonanhydride) of n-butylamine. After the solution had stood for 15 hours in a closed vessel at room temperature, appreciable pressure was noted when the system was opened to the atmosphere. A thin layer of the solution was poured on a glass plate and the solvent evaporated. This gave a clear film which when stripped from the plate was self-supporting.

A similar solution of another sample from the same batch of N-carboanhydride not containing the small amount of amine initiator developed no pressure upon standing for 15 hours in a closed vessel and failed to give a coherent film on evaporating the solvent (the crystalline N-carboanhydride was recovered).

The chloroform used in these and the following experiments was dried one month over calcium chloride and freshly redistilled immediately before use.

EXAMPLE V

To a solution of three parts of the N-carboanhydride of 2-amino-4,6,6-trimethylheptanoic acid in 223.35 parts of chloroform was added 1.489 parts of a chloroform solution containing 0.01 part (0.97 mole per cent based on N-carboanhydride) of diethylamine. After standing for one day in a closed container at room temperature, appreciable pressure was noted when the system was opened to the atmosphere. A thin layer of the solution was poured on a glass plate and the solvent evaporated. A clear, tough, self-supporting film was obtained.

A similar solution of another sample from the same batch of N-carboanhydride developed no pressure after standing for one day in a closed container at room temperature and gave no polymer (the crystalline N-carboanhydride was recovered) when treated under the same conditions without the small amount of added initiator.

EXAMPLE VI

A mixture of one part of the N-carboanhydride of 2-amino-4,6,6-trimethylheptanoic acid and seven parts of a solution of diethyl ether containing 0.00393 part (0.9 mole percent based on N-carboanhydride) of freshly distilled aniline was placed in a glass tube. The contents of the tube were then heated at atmospheric pressure, i. e., with one end of the tube open at 146° C. The ether flashed off in 15 seconds, and the contents of the tube melted to a clear liquid, and became a white solid within the next 15 seconds. The polymer was soluble in chloroform and gave a clear, transparent, flexible, self-supporting film upon evaporation of the solvent from a thin layer of the solution flowed onto a glass plate.

Another sample from the same batch of N-carboanhydride was heated under the same conditions without the added aniline. In this case eight minutes' heating time was necessary to give the same film forming polyamide obtained when the aniline was used.

EXAMPLE VII

One part of the N-carboanhydride of 1-aminocyclohexanecarboxylic acid was dissolved in 10.55 parts of reagent benzene (containing about 0.025% water). The resulting solution was placed in a closed container and allowed to stand at room temperature for one month. At the end of this time the solution was still clear and fluid. At this point the system was opened under anhydrous oxygen-free conditions, 0.001 part (0.19 mole per cent based on N-carboanhydride) of tetramethylenediamine in 0.708 part of diethyl ether added and the solution allowed to stand in a closed container at room temperature. At the end of one day's time a slight precipitate of the polyamide from 1-aminocyclohexanecarboxylic acid had formed and within a period of two days more, considerable polymer had formed and precipitated out of solution.

EXAMPLE VIII

A mixture of one part of the N-carboanhydride of 2-amino-4,6,6-trimethylheptanoic acid and seven parts of dry ether containing 0.000196 part (0.245 mole per cent based on N-carboanhydride) of anhydrous ammonia as initiator was placed in a glass tube. The contents of the tube were then heated at 120° C. for three minutes at atmospheric pressure, i. e., with one end of the tube open. At the end of this time the ether was completely removed. The temperature was then raised to 146° C. Within one minute's time the contents of the tube had become opaque and evolution of carbon dioxide had ceased. The resulting polyamide was soluble in chloroform. A thin layer of an approximately 2.5% solution of the polyamide in chloroform was flowed onto a glass plate and the solvent evaporated at room temperature. There was obtained a clear, transparent, flexible, self-sustaining film.

Another sample from the same batch of N-carboanhydride was heated under the same conditions without the added initiator. In this case ten minutes' heating time was necessary for the melt to become solid and evolution of carbon dioxide during the heating cycle was noticeably slower than in the foregoing example when the small amount of initiator was present.

In the process of this invention there may be employed, singly or in combination, ammonia or any amine having hydrogen on the amino nitrogen and having at most two hydrogen bearing amino groups, including primary aliphatic amines, e. g., methylamine, ethylamine, amylamine, dodecylamine; secondary aliphatic amines, e. g., dimethylamine, diamylamine, ethylbutylamine; primary aromatic amines, e. g., beta-naphthylamine and p-methylaniline; secondary aromatic amines, e. g., N-ethylaniline, N-butylaniline; primary aliphatic-aromatic amines, e. g., 2 - phenylethylamine, 2-phenyl-2-methylpropylamine; secondary aliphatic-aromatic amines, e. g., dibenzylamine and N-benzylaniline; substituted primary aliphatic amines, e. g., 2-chloroethylamine, 4-ethoxybutylamine, 4-phenoxybutylamine; substituted secondary aliphatic amines, e. g., N-2-chloroethylethylamine, 1-propylamino pentanone - 3, 3 - bromopropyl-4-bromo-n-amyl amine; substituted primary aromatic amines, e. g. 3-chloroaniline, 2-ethylaniline, 2,5-diethylaniline, 2-aminodiphenyl ether; substituted secondary aromatic amines, e. g., N-beta-chloroethylaniline, N-ethyl-o-phenetidine; substituted primary aliphatic-aromatic amines, e. g., 2-(4-chlorophenyl)ethylamine, 4 - nitro-beta-phenylethylamine; substituted secondary aliphatic-aromatic amines, e. g., primary cycloaliphatic amines, e. g., cyclohexylamine and 2-aminooctahydronaphthalene; secondary cycloaliphatic amines, e. g., dicyclohexylamine and N-methylcyclohexylamine; substituted primary cycloaliphatic amines, e. g., 4-nitrocyclohexylamine, 1-methylcyclohexylamine; substituted secondary cycloaliphatic amines, e. g., N-methyl-4-chlorocyclohexylamine, N - ethyl - 4-ethoxycyclohexylamine; diamines, e. g., ethylenediamine, hexamethylenediamine, N,N'-diethylethylenediamine, p-phenylenediamine, 3-ethoxyhexamethylenediamine; cyclic amines, e. g., piperidine, piperazine, 2,5-dimethylpiperazine, morpholine; heterocyclic amines, e. g., 2-aminothiophene, 2-aminothiazole, 2 - methylaminothiazole, and 2 - aminopyridine; hydroxy-containing amines, e. g., 2-hydroxyethylamine, 4 - hydroxy-N-methylaniline; mercapto-containing amines, e. g., 2-mercaptoethylamine; phenolic amines, e. g., 4-hydroxyaniline, 1 - (beta - aminoethyl) -4-hydroxy naphthalene; hydrazines, e. g., hydrazine, phenylhydrazine. The amine initiators should have at most one aromatic radical on the amino nitrogen, i. e., the amino nitrogen should be attached to at most one aromatic carbon. In order to obtain linear polymers ammonia and amines having not more than two hydrogen-bearing amino groups are used. These are preferred for this reason to triamines and other polyamines of more than two hydrogen-bearing amino groups.

Preferred for reasons of improved properties in the resulting polyamides are those amino-hydrogen-containing amines whose only active hydrogens are amino hydrogens. By "active hydrogens" are meant those capable of releasing methane when reacted with Zerewitinoff reagent (methylmagnesium iodide), such as the hydrogens of amino groups (—NH₂, —NHR), alcohol groups (—OH), carboxyl groups (—COOH), sulfonic acid groups (—SO₃H), thiol groups (—SH), etc. Amines which are, apart from amino nitrogen and hydrogen thereon, hydrocarbon are preferred because of the lack of complications in the reactions.

As may be seen from the examples, amino-hydrogen-containing amines not only serve as initiators for the condensation polymerization in solution, with carbon dioxide evolution, of the N-carboanhydrides of amino acids but also serve as initiators in thermal bulk polymerization. The length of the heating cycle necessary for the production of linear polyamides from the N-carboanhydrides of amino acids by thermal bulk polymerization is also markedly decreased when the condensation polymerization is carried out in the presence of small amounts of these amines.

The condensation polymerization, with carbon dioxide evolution, of the N-carboanhydrides of alpha and beta amino acids may be carried out by the process of this invention in bulk and in solution at temperatures from below to those above the decomposition point of the N-carboanhydrides but below the decomposition point of the resulting polyamide. Preferred for reasons of decreased decomposition of the resulting polyamide are temperatures in the range 20 to 200° C. Especially preferred because of the high molecular weight of the resulting polyamides produced in a shorter time are those temperatures in the range 30° C. below and 30° C. above the melting point of the lowest resulting N-carboanhydride involved. To decrease the amount of discoloration in the resulting polyamide, it is preferred to carry out the condensation polymerization in an inert atmosphere such as nitrogen.

The amine initiators of this invention are operable in the presence of other initiators such as water. Despite the presence of relatively large proportions of water, the small proportions of the amine initiators of this invention produce high molecular weight soluble polymers in a much shorter time than those systems without the added amine initiators.

As solvents for the solution polymerization of the N-carboanhydrides there may be used any substance which dissolves the N-carboanhydride at the temperature of polymerization and which is chemically inert toward the N-carboanhydride and the polymer derived therefrom. Suitable examples are aromatic solvents such as benzene, toluene, and xylene; halogenated hydrocarbons, e. g., chloroform, methylene dichloride, carbon tetrachloride, chlorobenzene, and trichloroethylene; aliphatic cyclic ketones, e. g., cyclohexanone, cyclopentanone, and 4-methylcyclohexanone; aliphatic-aromatic hydrocarbons, e. g., tetrahydronaphthalene.

The N-carboanhydrides whose condensation polymerization, singly or in mixtures, with evolution of carbon dioxide may be initiated by the amines of this invention are those obtainable from amino acids of radical length 3 or 4, i. e., alpha- or beta-amino acids. Preferred for reasons of thermal stability of the resultant polyamides are those N-carboanhydrides which may be obtained from amino acids of radical length 3 or 4 containing at most one hydrogen atom on the alpha-carbon atom. Particularly preferred for reasons of ease of preparation are the N-carboanhydrides obtainable from amino acids of radical length 3, i. e., alpha-amino acids containing at most one hydrogen on the alpha carbon. By the term "radical length" is meant the total number of atoms in the amino acid chain between and inclusive of the amino nitrogen and the acyl carbon atoms. By "alpha-carbon atom" is meant, of course, the carbon atom bearing the acyl carbon atom.

Specific examples of N-carboanhydrides, whose condensation polymerization, singly or in mixtures, with evolution of carbon dioxide may be initiated by the amines of this invention include, in addition to those given in the examples, those of alpha amino acids, or their suitably protected derivatives, such as valine, alanine, norleucine, isoleucine, tryptophane, methionine, tyrosine, cystine, lysine, sarcosine, histidine, pipecolic acid, glutamic acid, 1-amino-3,3,5-trimethylcyclohexanecarboxylic acid, 2-cyclohexylglycine, N-phenylglycine, 1-amino-2-methylcyclobutanecarboxylic acid, 1-aminocyclopentanecarboxylic acid, 1-aminocycloheptanecarboxylic acid, 4-amino-1-methylpiperidine-4-carboxylic acid, 3 - aminotetrahydrothiophene-3-carboxylic acid, 3-aminotetrahydrofuran-3-carboxylic acid and those of beta amino acids such as beta-aminobutyric acid, alpha-phenyl-beta-aminopropionic acid, beta-methyl - beta - aminobutyric acid, aminopivalic acid, beta-phenyl-beta-aminopropionic acid and beta-aminovaleric acid.

The mole per cent of amine should not exceed 1.0 mole per cent, based on N-carboanhydride present, since the use of greater amounts of amine leads to undesirably low molecular weight polymers of inferior utility as is illustrated by the following table:

Table

| Mole Per Cent Cyclohexylamine | Polymerization, Temperature °C. | Intrinsic Viscosity [1] | Tensile Strength (lbs./sq. in.) | Remarks [2] |
|---|---|---|---|---|
| 3.33 | 50 | 0.13 | ([3]) | Weak film, not self-supporting. |
| 1.66 | 50 | 0.16 | Same | Same. |
| 1.00 | 65 | 0.24 | 3,250 | Coherent, self-supporting tough film. |
| 0.75 | 50 | 0.26 | 3,843 | Same, slightly better. |
| 0.50 | 50 | 0.29 | 5,085 | Same, still better. |
| 0.25 | 50 | 0.35 | 5,240 | Same, even better. |

[1] The intrinsic viscosity was determined at 0.5 g./100 ml. concentration in m-cresol at 25° C.
[2] All films were clear and transparent.
[3] Too brittle to test.

All of the above polymerizations are of a 50:50, by weight, mixture of the N-carboanhydrides of l-leucine and dl-beta-phenylalanine at 2.25% concentration, by weight, in reagent benzene. The reagent benzene contained approximately 0.025% water, i. e., about 8.4 mole per cent based on the N-carboanhydrides in the benzene.

When the ratio of amine to N-carboanhydride is greater than 1.0 mole per cent amine initiator of this invention (based on the total N-carboanhydrides involved), the polyamides obtained are too low in molecular weight to give tough and useful products. However, if this ratio is from 1.0:100 to 0.001:100 (i. e., 1.0 to 0.001 mole per cent amine initiator of this invention based on the total N-carboanhydrides involved), the polyamides obtained are of high molecular weight, give tough and useful products, and are capable of being shaped into useful articles; e. g., they can be converted into films and fibers. Values of from 0.5:100 to 0.05:1000 for this ratio (i. e., 0.5 to 0.05 mole per cent of the amine initiators of this invention based on the total N-carboanhydrides involved and corresponding to degrees of polymerization in the resulting polyamides of 200 and 2000, respectively) are preferred since the polyamides are of high enough molecular weight to give tough and highly useful products while the time necessary for complete polymerization is markedly decreased.

The term "intrinsic viscosity" has its conventional meaning as given in "Advances in Colloid Science," vol. II, page 209.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of a linear amino acid polymer from the N-carbonanhydride of an amino carboxylic acid of radical length from 3 to 4 which comprises bringing said N-carboanhydride in contact with, as polymerization initiator, an amine having hydrogen on amino nitrogen as its only active hydrogen, having hydrogen and not more than one aromatic radical on at least one amino nitrogen, and having at most two hydrogen bearing amino groups, said amine being present in the amount of 0.001 to 1.0 mole per cent, based on the total N-carboanhydride present.

2. Process of claim 1 wherein the initiator contains, apart from amino nitrogen, only carbon and hydrogen.

3. Process of claim 1 wherein the amine initiator is free from aliphatic unsaturation and contains, apart from amino nitrogen, only carbon and hydrogen.

4. Process of claim 1 wherein the initiator is a primary amine free from aliphatic unsaturation and contains, apart from amino nitrogen, only carbon and hydrogen.

5. Process of claim 1 wherein a plurality of N-carboanhydrides is employed.

6. A process for the preparation of a linear amino acid polymer from the N-carboanhydride of an amino carboxylic acid of radical length from 3 to 4 which comprises bringing said N-carboanhydride in contact with, as polymerization initiator, a compound of the class consisting of ammonia and amino hydrogen bearing amines having hydrogen on amino nitrogen as their only active hydrogen, having hydrogen and not more than one aromatic radical on at least one amino nitrogen, and having at most two hydrogen bearing amino groups, said compound being present in the amount of 0.001 to 1.0 mole per cent, based on the total N-carboanhydride present.

7. A process for the preparation of a linear amino acid polymer from the N-carboanhydride of an alpha amino carboxylic acid which comprises bringing said N-carboanhydride in contact with, as polymerization initiator, a compound of the class consisting of ammonia and amino hydrogen bearing amines having hydrogen on amino nitrogen as their only active hydrogen, having hydrogen and not more than one aromatic radical on at least one amino nitrogen, and having at most two hydrogen bearing amino groups, said compound being present in the amount of 0.001 to 1.0 mole per cent, based on the total N-carboanhydride present.

8. A process for the preparation of a linear amino acid polymer from the N-carboanhydride of an alpha amino carboxylic acid having at most one hydrogen on the alpha carbon which comprises bringing said N-carboanhydride in contact with, as polymerization initiator, an amine having hydrogen on amino nitrogen as its only active hydrogen, having hydrogen and not more than one aromatic radical on at least one amino nitrogen, and having at most two hydrogen bearing amino groups, said amine being present in the amount of 0.001 to 1.0 mole per cent, based on the total N-carboanhydride present.

9. A process for the preparation of a linear amino acid polymer from the N-carboanhydride of an alpha amino carboxylic acid which comprises bringing said N-carboanhydride in contact with, as polymerization initiator, an amine having hydrogen on amino nitrogen as its only active hydrogen, having hydrogen and not more than one aromatic radical on at least one amino nitrogen, and having at most two hydrogen bearing amino groups, said amine being present in the amount of 0.001 to 1.0 mole per cent, based on the total N-carboanhydride present.

10. A process for the preparation of a linear amino acid polymer from the N-carboanhydride of an alpha amino carboxylic acid having at most one hydrogen on the alpha carbon which comprises bringing said N-carboanhydride in contact with, as an initiator of the polymerization, an amine having, as its sole active hydrogen, hydrogen on amino nitrogen, containing only carbon, hydrogen, and amino nitrogen, having hydrogen and not more than one aromatic radical on at least one amino nitrogen, and having at most two hydrogen bearing amino groups, said amine being employed in the amount of 0.001 to 1.0 mole per cent based on total N-carboanhydride present.

11. A process for the preparation of a linear amino acid polymer from the N-carboanhydride of an alpha amino carboxylic acid having at most one hydrogen on the alpha carbon which comprises bringing said N-carboanhydride in contact with, as polymerization initiator, an amine free from aliphatic unsaturation, having hydrogen on amino nitrogen as its only active hydrogen, having hydrogen and not more than one aromatic radical on at least one amino nitrogen, having at most two hydrogen bearing amino groups, and containing apart from amino nitrogen, only carbon and hydrogen, said amine being present in the amount of 0.001 to 1.0 mole per cent, based on the total N-carboanhydride present.

12. Process of claim 11 wherein a plurality of N-carboanhydrides is employed.

13. A process for the preparation of a linear amino acid polymer from the N-carboanhydride of an alpha monoaminocarboxylic acid which comprises bringing said N-carboanhydride in contact with, as polymerization initiator an amine having amino hydrogen as its sole Zerewitinoff active hydrogen, containing only carbon, hydrogen, and amino nitrogen, having hydrogen and not more than one aromatic radical on at least one amino nitrogen, and having at most two hydrogen bearing amino groups, said amine being present in the amount of 0.001 to 1.0 mole per cent, based on the total N-carboanhydride present.

14. In the preparation of a linear amino acid polymer from the N-carboanhydride of an alpha monoaminomonocarboxylic acid, the improvement wherein the condensation polymerization with carbon dioxide evolution is effected by bringing said N-carboanhydride in contact with, as polymerization initiator, an amine which has at most two hydrogen-bearing amino groups and has hydrogen and at most one aromatic radical on at least one amino nitrogen, and which is, apart from amino nitrogen and hydrogen thereon, wholly hydrocarbon, said amine being present in the amount of 0.001 to 1.0 mole per cent, based on the total N-carboanhydride present.

15. Process of claim 14 wherein the N-carboanhydride is the N-carboanhydride of an alpha monoaminomonocarboxylic acid having as its only Zerewitinoff active hydrogen the carboxyl and amino hydrogens.

16. Process of claim 15 wherein the amine initiator is free from aliphatic unsaturation.

17. Process of claim 15 wherein the amine initiator is a primary amine free from aliphatic unsaturation.

18. A process for the preparation of a linear amino acid polymer from the N-carboanhydride of an amino carboxylic acid of radical length from 3 to 4 which comprises bringing said N-carboanhydride in contact with, as a polymerization initiator, ammonia in the amount of 0.001 to 1.0 mole per cent, based on the total N-carboanhydride present.

ROBERT NEAL MacDONALD.

REFERENCES CITED

The following references are of record in the file of this patent:

UNITED STATES PATENTS

| Number | Name | Date |
|---|---|---|
| 2,406,186 | Baldwin et al. | Aug. 20, 1946 |

OTHER REFERENCES

Fruton, in Advances in Protein Chemistry, vol. V, 1949, page 61.

Richter: Organic Chemistry (Spielmann, 2d ed.), vol. 1, pp. 339–40 (1925).

Woodward et al.: J. A. C. S., vol. 69, pp. 1551–2, June 1947.

Office of Technical Services, P. B. 34279, December 13, 1946.